W. H. MAKUTCHAN.
ROLLER BEARING.
APPLICATION FILED APR. 30, 1917.
1,246,294. Patented Nov. 13, 1917.
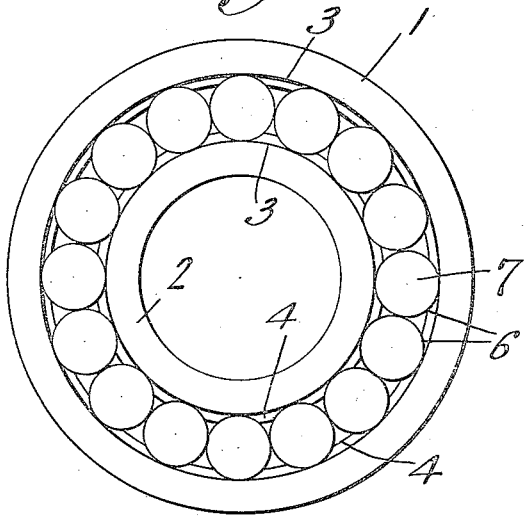
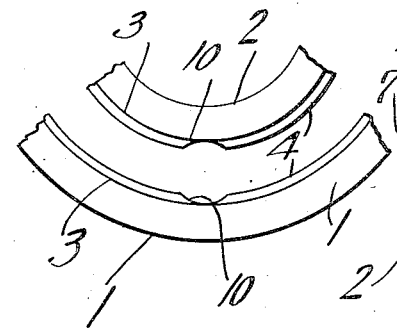
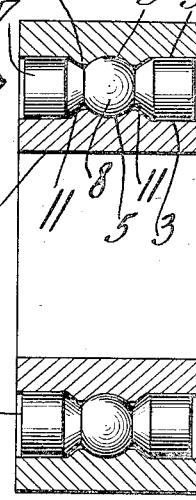
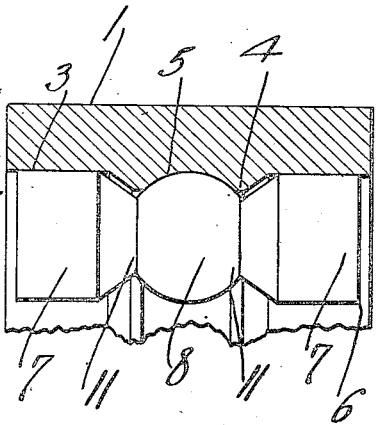
Inventor
W. H. Makutchan

UNITED STATES PATENT OFFICE.

WILLIAM HENERY MAKUTCHAN, OF CHICAGO, ILLINOIS.

ROLLER-BEARING.

1,246,294.  Specification of Letters Patent.  Patented Nov. 13, 1917.

Application filed April 30, 1917. Serial No. 165,450.

*To all whom it may concern:*

Be it known that I, WILLIAM H. MAKUTCHAN, a citizen of the United States, residing at Chicago, in the county of Cook and State of Illinois, have invented a new and useful Roller-Bearing, of which the following is a specification.

The device forming the subject matter of this application is a roller bearing, and one object of the invention is to provide a device of this kind including a plurality of anti-friction rollers each comprising an intermediate spherical portion, adapted to receive lateral thrust, and terminal cylindrical elements adapted to receive the radial thrust, the said intermediate and terminal parts being of a common diameter.

Another object of the invention is to provide novel means whereby the rollers may be introduced between the coöperating inner and outer annular members of the bearing, the construction being such that the space between the inner and outer annular members may be filled circumferentially full of rollers, no separators being used.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 is an end elevation of a bearing constructed in accordance with the present invention;

Fig. 2 is a cross section of the bearing;

Fig. 3 is a fragmental section in a plane at right angles to the cutting plane in Fig. 2 and showing the roller in elevation;

Fig. 4 is a fragmental end elevation wherein the rollers have been omitted.

In carrying out the present invention there is provided an outer annular member 1 and an inner annular member 2, the members 1 and 2 being provided with circumferential tracks 3 at their ends. The members 1 and 2 are supplied, further, with circumferential ribs 4, disposed inwardly of the ends of the said members 1 and 2, each of the members 1 and 2 being provided, between its ribs 4, with a concaved circumferential track 5. The end tracks 3 of the members 1 and 2 are parallel.

Disposed between the annular members 1 and 2 of the bearing are rollers 6, comprising cylindrical terminal elements 7 of a common diameter from end to end, and coöperating with the end tracks 3, and an intermediate spherical portion 8 coöperating with the intermediate tracks 5, each roller having circumscribing grooves 11 receiving the ribs 4. The cylindrical end elements 7 and the spherical portion 8 of the roller 6 are of a common diameter.

The ribs 4 of the members 1 and 2 are provided with coöperating notches 10 defining an opening, through which the rollers 6 may be inserted endwise, between the members 1 and 2, the rollers being moved, one at a time, circumferentially of the members 1 and 2, until the entire space between the members 1 and 2 is filled circumferentially with friction elements, an increased bearing area being provided, and the use of separators between the rollers 6 being unnecessary. The spherical portions 8 coöperating with the ribs 4, receive the lateral thrust, the cylindrical rollers 7 receiving the radial thrust.

Having thus described the invention, what is claimed is:—

1. A bearing of the class described comprising an outer annular member and an inner annular member, each of which is provided with circumscribing tracks at its ends, with circumscribing ribs disposed between its ends, and with an intermediate track located between the ribs, and rollers between the inner and outer members, the rollers each comprising terminal elements coöperating with the end tracks, and an intermediate portion coöperating with the intermediate tracks, each roller having circumscribing grooves receiving the ribs, the ribs of the inner and outer members being provided with coöperating notches defining a single opening through which the rollers may be inserted endwise between the inner and outer members.

2. A bearing of the class described comprising an outer annular member and an inner annular member, each of which is provided with circumferential tracks at its ends, with circumferential ribs disposed between its ends, and with a transversely concaved circumferential intermediate track located between the ribs, the end tracks of the inner and outer members being parallel; and rollers between the inner and outer members, the rollers each comprising cylindrical elements coöperating with the end tracks, and an intermediate spherical portion coöperating with the intermediate tracks, each roller having circumscribing grooves receiving the ribs, the cylindrical and spherical parts of each roller being of a common diameter, the ribs of the inner and outer members being provided with coöperating notches defining an opening through which the rollers may be inserted endwise between the inner and outer members.

In testimony that I claim the foregoing as my own, I have hereto affixed my signature in the presence of two witnesses.

WILLIAM HENERY MAKUTCHAN.

Witnesses:
BRUNO LIPKE,
HAROLD A. ANDERSON.